(12) United States Patent  
Ravimohan et al.

(10) Patent No.: US 9,110,677 B2  
(45) Date of Patent: Aug. 18, 2015

(54) SYSTEM AND METHOD FOR PREDICTING AND IMPROVING BOOT-UP SEQUENCE

(71) Applicant: SanDisk Technologies Inc., Plano, TX (US)

(72) Inventors: Narendhiran Chinnaanangur Ravimohan, Karnataka (IN); Vithya Kannappan, Karnataka (IN); Ninad Walvekar, Karnataka (IN); Saranya Nedunchezhiyan, Karnataka (IN); Pranesh Babykannan, Karnataka (IN)

(73) Assignee: SanDisk Technologies Inc., Plano, TX (US)

( * ) Notice: Subject to any disclaimer, the term of this patent is extended or adjusted under 35 U.S.C. 154(b) by 92 days.

(21) Appl. No.: 13/961,360

(22) Filed: Aug. 7, 2013

(65) Prior Publication Data

US 2014/0281458 A1 Sep. 18, 2014

(30) Foreign Application Priority Data

Mar. 14, 2013 (IN) ............................ 1111/CHE/2013

(51) Int. Cl.
*G06F 9/44* (2006.01)
*G06F 12/08* (2006.01)

(52) U.S. Cl.
CPC ............ *G06F 9/4401* (2013.01); *G06F 9/4403* (2013.01); *G06F 9/4418* (2013.01); *G06F 12/0862* (2013.01); *G06F 2212/602* (2013.01); *G06F 2212/6026* (2013.01)

(58) Field of Classification Search
CPC .......................... G06F 9/4401; G06F 12/0862
See application file for complete search history.

(56) References Cited

U.S. PATENT DOCUMENTS

| | | | |
|---|---|---|---|
| 6,073,232 A | 6/2000 | Kroeker et al. | |
| 7,607,000 B1 * | 10/2009 | Smith et al. ....................... | 713/1 |
| 7,640,425 B2 * | 12/2009 | Kasuga ............................. | 713/1 |
| 8,082,433 B1 | 12/2011 | Fallone et al. | |
| 2003/0135729 A1 | 7/2003 | Mason, Jr. et al. | |
| 2006/0271774 A1 | 11/2006 | Zimmer et al. | |
| 2008/0209198 A1 | 8/2008 | Majni et al. | |

(Continued)

OTHER PUBLICATIONS

Behdad Esfahbod, "Preload—An Adaptive Prefetching Daemon," dated 2006, pp. 1-72, Thesis Submitted in Conformity with the Requirements for the Degree of Master of Science, Graduate Department of Computer Science, University of Toronto, Retrieved from the internet: http://www.behdad.org/download/preload.pdf.

(Continued)

*Primary Examiner* — Stefan Stoynov
(74) *Attorney, Agent, or Firm* — Brinks Gilson & Lione

(57) ABSTRACT

A method for optimizing a boot up sequence includes, during a host idle time or during data transfer: obtaining a predicted read address from the a prediction table, prefetching from the non-volatile data store, and saving the prefetched data in memory. Also included is receiving a current read command issued by the host and if the read address matches the predicted read address, providing to the host the prefetched data saved in temporary memory, and indicating a match. If a match is not indicated, obtaining current data from the non-volatile data store corresponding to the read address of the current read command, and providing the current data to the host. If a match was not indicated, searching the data prediction table for the predicted read address that matches the read address corresponding to the current read command, and if found in the data prediction table, recording the offset value.

18 Claims, 9 Drawing Sheets

(56) References Cited

U.S. PATENT DOCUMENTS

| | | | |
|---|---|---|---|
| 2008/0256295 A1* | 10/2008 | Lambert et al. | 711/118 |
| 2009/0158023 A1 | 6/2009 | Kern | |
| 2009/0249055 A1 | 10/2009 | Itoh | |
| 2010/0017591 A1 | 1/2010 | Smith et al. | |
| 2011/0173429 A1 | 7/2011 | Hollis | |
| 2014/0095856 A1* | 4/2014 | Tearse-Doyle | 713/2 |

OTHER PUBLICATIONS

Hiroki Kaminaga, "Improving Linux Startup Time Using Software Resume (and other techniques)," dated Jul. 19, 2006, pp. 1-12, Proceedings of the Linux Symposium, vol. 2, Ottawa, Ontario, Retrieved from the Internet: http://www.linuxsymposium.org/archive/OLS/Reprints-2006/kaminaga-reprint.pdf.

Kazuya Yamakita et al., "Phase-based reboot for cheap reboot-based recovery," dated Jun. 27, 2011, pp. 169-180, Dependable Systems & Networks, 2011 IEEE/IFIP 41$^{st}$ International Conference on, IEEE, Hong Kong.

Mohit Arora et al., "Understanding embedded-system-boot techniques," dated Feb. 3, 2011, pp. 1-7, EDN Asia online, Retrieved from the Internet: http://edn.com/Pdf/ViewPdf?contentItentId=4363984.

Sanvido M et al., "nand Flash Memory and Its Role in Storage Architectures," dated Nov. 1, 2008, pp. 1864-1874, Proceeding of the IEEE, vol. 96, No. 11, IEEE. New York, US.

Yongsoo Joo et al., "FAST; Quick Application Launch on Solid-State Drives," dated Feb. 15, 2011, pp. 1-14, Proceedings of the 9$^{th}$ USENIX Conference on File and Storage Technologies (FAST '11), San Jose, California, US, Retrieved from the Internet: www.usenix.org/event/fast11/tech/full_papers/Joo.pdf.

Yongsoo Joo et al., "Improving Application Launch Performance on Solid State Drives," dated Jul. 12, 2012, pp. 727-743, Journal of Computer Science and Technology, Kluwer Academic Publishers, BO, vol. 27, No. 4.

International Search Report and Written Opinion, dated Aug. 6, 2014, pp. 1-16, International Application No. PCT/US2014/021319, European Patent Office, Rijswijk, The Netherlands.

* cited by examiner

SYSTEM AND METHOD FOR PREDICTING AND IMPROVING BOOT-UP SEQUENCE

RELATED APPLICATIONS

This application claims priority from Indian Patent Application No. 1111/CHE/2013 filed Mar. 14, 2013, the entire contents of which is hereby incorporated by reference.

TECHNICAL FIELD

This application relates generally to improving a boot up sequence and in particular, to improving a boot up sequence in a computer system by predicting page reads in a controller of a non-volatile flash memory.

BACKGROUND

Non-volatile memory systems, such as flash memory, have been widely adopted for use in consumer products. Memory devices, such as the flash memory devices and other memory devices, have been widely adopted for use in consumer products, and in particular, mobile devices and computers using solid state disk drives.

Flash memory may be found in different forms, for example in the form of a portable memory card that can be carried between host devices or as a solid state drive (SSD) embedded in a host device. Two general memory cell architectures found in flash memory include NOR and NAND. In a typical NOR architecture, memory cells are connected between adjacent bit line source and drain diffusions that extend in a column direction with control gates connected to word lines extending along rows of cells. A memory cell includes at least one storage element positioned over at least a portion of the cell channel region between the source and drain. A programmed level of charge on the storage elements thus controls an operating characteristic of the cells, which can then be read by applying appropriate voltages to the addressed memory cells.

A typical NAND architecture utilizes strings of more than two series-connected memory cells, such as 16 or 32, connected along with one or more select transistors between individual bit lines and a reference potential to form columns of cells. Word lines extend across cells within many of these columns. An individual cell within a column is read and verified during programming by causing the remaining cells in the string to be turned on so that the current flowing through a string is dependent upon the level of charge stored in the addressed cell.

NAND flash memory can be fabricated in the form of single-level cell flash memory, also known as SLC or binary flash, where each cell stores one bit of binary information. NAND flash memory can also be fabricated to store multiple states per cell so that two or more bits of binary information may be stored. This higher storage density flash memory is known as multi-level cell or MLC flash. MLC flash memory can provide higher density storage and reduce the costs associated with the memory. The higher density storage potential of MLC flash tends to have the drawback of less durability than SLC flash in terms of the number write/erase cycles a cell can handle before it wears out. MLC can also have slower read and write rates than the more expensive and typically more durable SLC flash memory. Memory devices, such as SSDs, may include both types of memory.

Boot up of a computer system, a cellular telephone, or other mobile device is an important user consideration and has a large impact on the user's satisfaction with respect to the speed of the device. There is a considerable difference in the host command sequence between a first time boot up and a second time boot up. However, from the second boot up going forward, there is little or no difference in the boot up sequence. In part, this is because various files and folders are created during the first time boot up, and other housekeeping tasks are performed, which may not be performed during subsequent boot ups.

SUMMARY

According to one aspect of the invention, a memory storage system is operative to interface with a host, and includes a memory system controller, a non-volatile data store operatively coupled to the memory system controller, and a data prediction table accessible by the memory system controller.

According to one aspect of the invention, a memory system controller has a non-volatile data store and a data prediction table, and the controller is in communication with a host device. A method for optimizing a boot up sequence of a computer system includes, during a host idle time or during a data transfer corresponding to a prior host read command: obtaining a predicted read address from the data prediction table based on a previously determined offset value, prefetching from the non-volatile data store, data corresponding to the read address obtained from the data prediction table, and saving the prefetched data in temporary memory.

The method also includes receiving a current read command issued by the host and if the read address corresponding to the current read command matches the predicted read address, providing to the host the prefetched data saved in temporary memory, and indicating a match. But if a match is not indicated, obtaining current data from the non-volatile data store corresponding to the read address of the current read command, and providing the current data to the host. In accordance with the method, if a match was not indicated, searching the data prediction table for the predicted read address that matches the read address corresponding to the current read command, and if found in the data prediction table, recording the offset value.

According to other aspects of the invention, the method includes initializing the data prediction table by recording a sequence of read commands issued by the host device to the memory system controller, where the sequence of read commands corresponds to a second boot up sequence.

The method further includes recording in the data prediction table a sequence of read commands issued by the host, including memory addresses associated with each read command and a corresponding data count or sector count.

Additionally, the aspects of the invention include identifying a valid boot up sequence that corresponds to a power-on reset or a wake-up from hibernation, where a valid boot up sequence excludes soft boot up sequences and recovery from a stand-by mode.

Other methods and systems, and features and advantages thereof will be, or will become, apparent to one with skill in the art upon examination of the following figures and detailed description. It is intended that the scope of the invention will include the foregoing and all such additional methods and systems, and features and advantages thereof.

BRIEF DESCRIPTION OF THE DRAWINGS

The components in the figures are not necessarily to scale, emphasis instead being placed upon illustrating various

DETAILED DESCRIPTION

Figure 1:
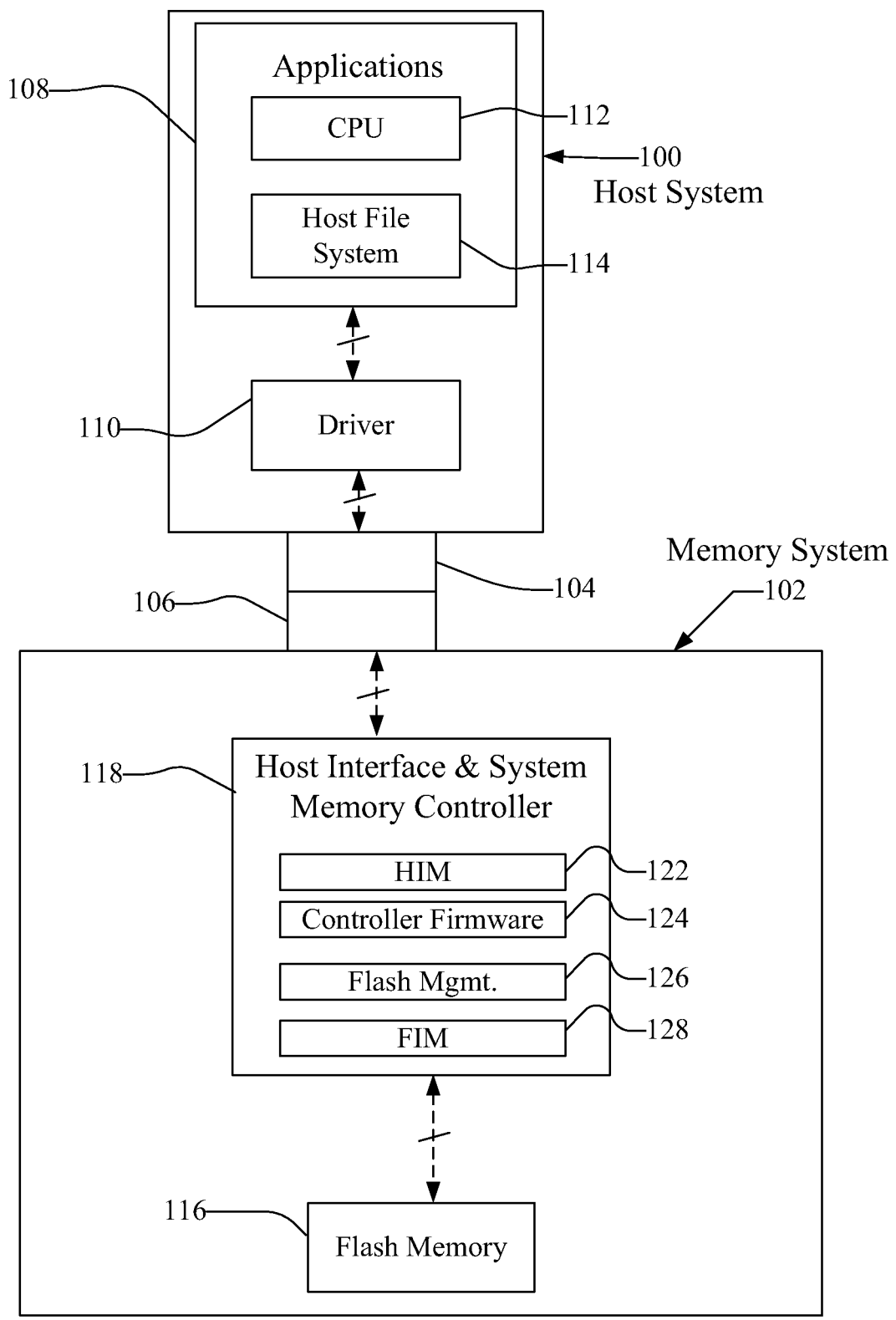
FIG. 1 is a block diagram of a host connected to a memory system.
Figure 2:
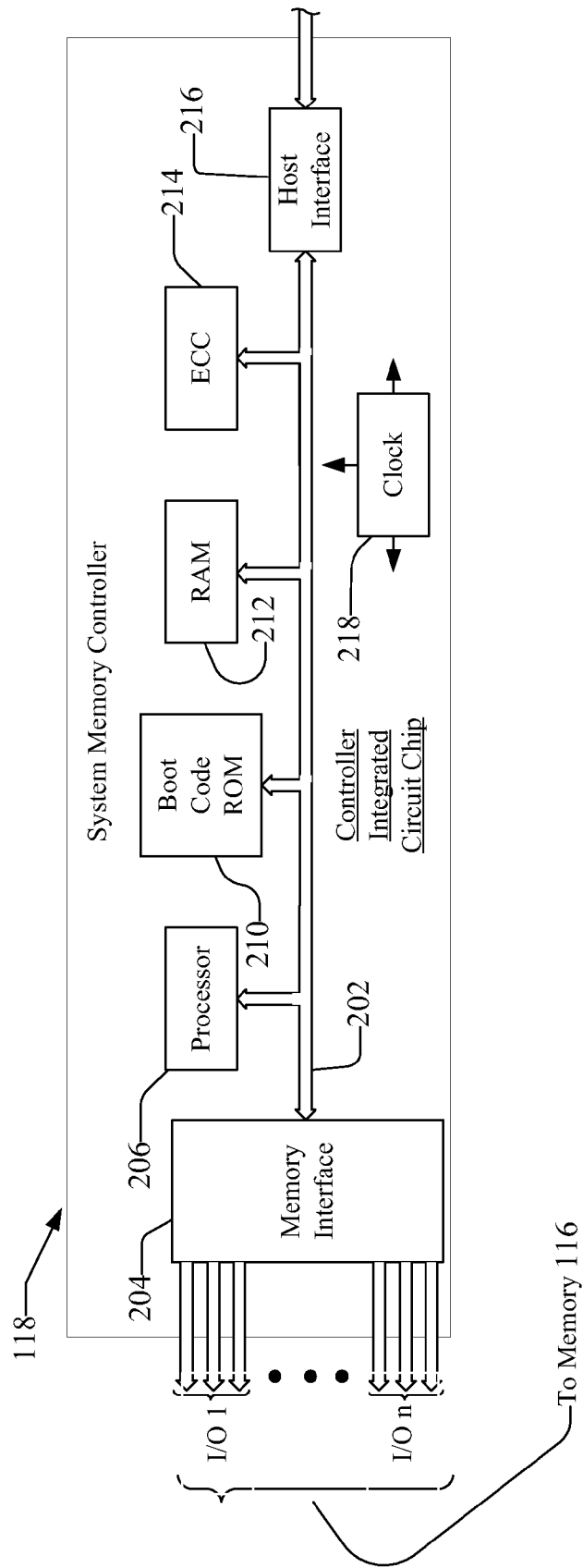
FIG. 2 is a block diagram of an exemplary flash memory system controller for use in the system of FIG. 1.
Figure 3:
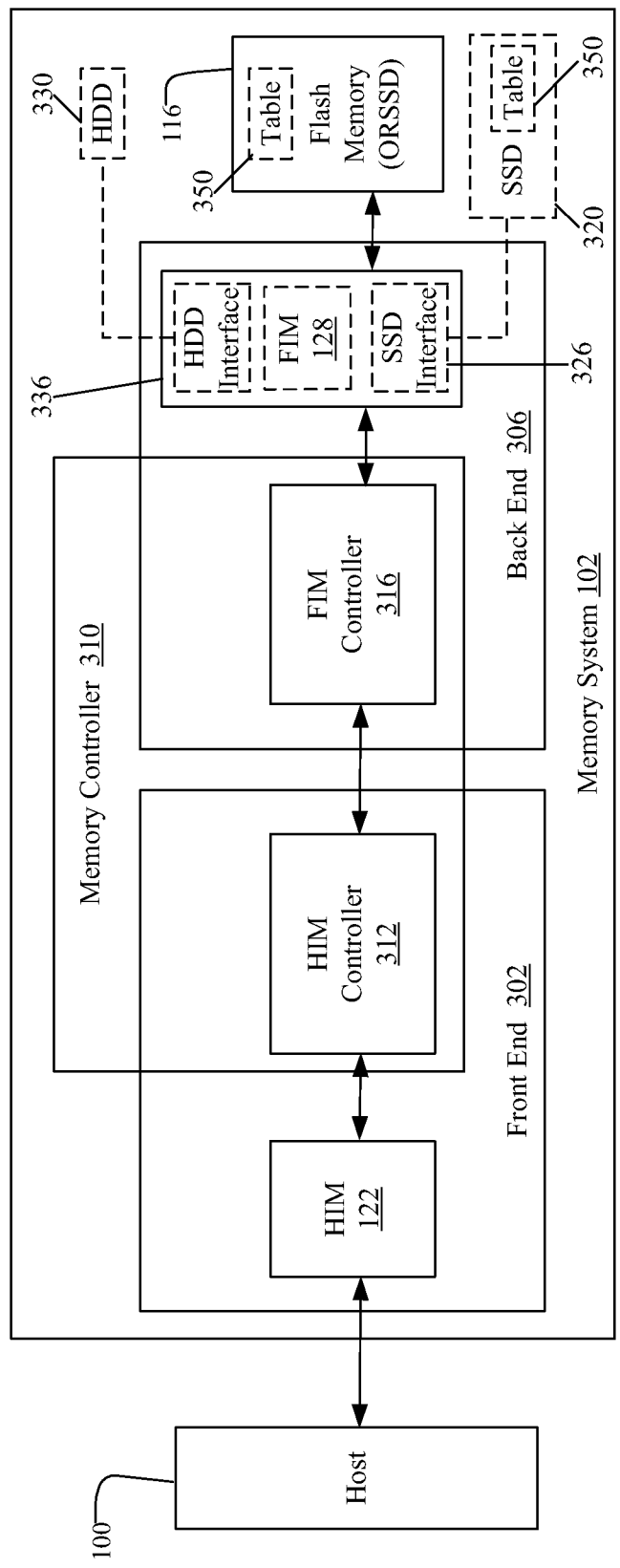
FIG. 3 is a block diagram of a memory system according to one embodiment.

A flash memory system suitable for use in implementing aspects of the invention is shown in FIGS. 1-3. A host system 100 of FIG. 1 may store data into and retrieve data from a memory system of a flash memory system 102. In other embodiments, the host system 100 may store data into and retrieve data from a hard disk drive (HDD). The memory system 102 may be embedded within the host, such as in the form of a solid state disk (SSD) drive installed in a personal computer. Alternatively, the memory system 102 may be in the form of a flash memory card that is removably connected to the host through mating parts 104 and 106 of a mechanical and electrical connector, as illustrated in FIG. 1. A flash memory configured for use as an internal or embedded SSD drive may look similar to the schematic block diagram of FIG. 1, with one difference in that the location of the memory system 102 may be internal to the host. SSD drives may be in the form of discrete modules that are drop-in replacements for rotating magnetic disk drives (HDDs).

Examples of commercially available removable flash memory cards include the CompactFlash (CF), the MultiMediaCard (MMC), Secure Digital (SD), miniSD, Memory Stick, SmartMedia, TransFlash, and microSD cards. Although each of these cards may have a unique mechanical and/or electrical interface according to its standardized specifications, the flash memory system included in each may be similar. Such cards may be commercially available from SanDisk Corporation, the assignee of the present application. SanDisk also provides a product line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

Host systems that may use SSDs, memory cards and flash drives are many and varied. They include personal computers (PCs), such as desktop or laptop and other portable computers, tablet computers, cellular telephones, smartphones, personal digital assistants (PDAs), digital still cameras, digital movie cameras, and portable media players. For portable memory card applications, a host may include a built-in receptacle for one or more types of memory cards or flash drives, or a host may require adapters into which a memory card is plugged. The memory system may include its own memory controller and drivers, but there may also be some memory-only systems that are instead controlled by software executed by the host to which the memory is connected.

In some memory systems containing the controller, especially those embedded within a host, the memory, the controller, and the drivers are often formed on a single integrated circuit chip. In such systems, the host may communicate with the memory card using any suitable communication protocol, such as but not limited to, Secure Digital (SD) protocol, Memory Stick (MS) protocol and Universal Serial Bus (USB) protocol.

The host system 100 of FIG. 1 may be viewed as having two main portions, insofar as the memory system 102 is concerned, and is made up of a combination of circuitry (hardware) and software. Such portions may include an applications portion 108 and a driver portion 110 that interfaces with the memory system 102. There may be a central processing unit (CPU) 112 implemented in circuitry, and a host file system 114 implemented in hardware or software. In a typical PC, for example, the applications portion 108 may include a processor 112 running word processing, graphics, control, or other popular application software.

In a camera, cellular telephone, or other host system 114, for example, which are primarily dedicated to performing a single set of functions, the applications portion 108 may include the specific software. In a camera, for example, this may include operating the camera so as to capture and store photographs and images, and in the cellular telephone, for example, this may include placing and receiving calls, and the like.

The memory system 102 of FIG. 1 may include non-volatile memory, such as flash memory 116, and a flash memory system controller 118 that interfaces with the host 100 to which the memory system 102 is connected, for passing data back and forth, and controls the memory 116, which may be flash memory, but need not be restricted to flash memory. The system memory controller 118 may convert between logical addresses of data used by the host 100 and physical addresses of the flash memory 116 (or HDD) during data programming and reading.

Functionally, the flash memory system controller 118 may include a host interface module (HIM) 122 configured to interface with the host system and controller firmware module 124 for coordinating with the host interface module 122, a flash interface module (FIM) 128, and flash management logic 126 for internal memory management operations, such as garbage collection. One or more flash interface modules (FIMs) 128 may be included for providing a communication interface between the controller and the flash memory 116. The flash memory system controller 118 may be implemented on a single integrated circuit chip, such as an application specific integrated circuit (ASIC), such as shown in FIG. 2.

Turning now to FIGS. 1 and 2, an internal data bus 202 is shown coupling multiple components. A processor 206 included in the flash memory system controller 118 may be configured as a multi-thread processor capable of communicating via a memory interface 204 having I/O ports for each memory bank in the flash memory 116. The processor 206 may communicate with a boot code ROM 210, a RAM buffer 212, an error correction code (ECC) module 214, and a host interface 216, via the internal data bus 202. The flash memory system controller 118 may include an internal clock 218.

The ROM 210 may be used to initialize the memory system 102, such as a flash memory device. The memory system 102 that is initialized may be referred to as a card, due to its physical placement on a printed circuit board. The ROM 210 in FIG. 2 may be a region of read only memory whose purpose is to provide boot up code to the RAM 212 for processing a program, such as the initialization and booting of the memory system 102. The ROM may be present in the ASIC rather than in the flash memory chip.

FIG. 3 is a block diagram of another embodiment of the memory system 102. The host system 100 may be in communication with the memory system 102 as discussed with respect to FIG. 1. The memory system 102 may include a front end 302 that is coupled with the host 100 and a back end 306 that is coupled with the flash memory 116. In one embodiment, the front end 302 and the back end 306 may be referred to as the memory controller 310, and may be part of the flash memory system controller 118.

The front end 302 may logically include the host interface module (HIM) 122 and a HIM controller 312. The back end 306 may logically include the flash interface module (FIM) 128 and a FIM controller 316. Accordingly, the memory controller 310 may be logically portioned into two modules, namely the HIM controller 312 and the FIM controller 316. The HIM 122 provides interface functionality for the host device 100, and the FIM 128 provides interface functionality for the flash memory 116.

In some embodiments, a solid state drive (SSD) 320 may be separate and apart from the flash memory 116, as shown in dashed lines in FIG. 3. In such an embodiment, an SSD interface module 326 may provide the interface to the SSD in a similar way as the FIM 128 provides an interface to the flash memory 116.

In still further embodiments, a rotating magnetic hard drive (HDD) 330 may be included in addition to the flash memory 116 and/or SSD 320, or may replace the SSD 320 and/or flash memory 116. The HDD 330 may be separate and apart from other components in the memory controller 310, as shown in dashed lines in FIG. 3. In such an embodiment, an HDD interface module 336 may provide the interface to the HDD 330 in a similar way as the FIM 128 provides an interface to the flash memory 116.

In operation, data is received from the HIM 122 by the HIM controller 312 during a write operation of host device 100 to the memory system 102. The HIM controller 312 may pass control of data received to the FIM controller 316. The FIM controller 316 may determine how the received data is to be written to the flash memory 116. The received data may be provided to the FIM 128 by the FIM controller 316 for writing data onto the flash memory 116 based on the determination made by the FIM controller 308.

When a read command is issued by the host 100, the front end 302 recognizes the command and sends the request to the back end 306. The back end 306 reads the specified data by the front end 302 from the flash memory 116 and places it in a data buffer, and transfers the address in the buffer to the front end 302. The front end 302 handles transferring the data from the buffer to the host 10.

When a write command is issued by the host 100, the front end 302 receives the data from the host 100 and places it in the buffer, and sends to the back end 306 a request to write this data in the flash memory. The back end 306 then takes this data and writes it into the flash memory 116.

With the above hardware and software considerations in mind as set forth above, the boot up time for host systems using solid state disk drives (SSD), and hard disk drives (HDD) as storage locations, is an important consideration to the user. All too often, the user perceives the boot up time as taking too long. Accordingly, any decrease in boot up time increases user satisfaction with the product.

In embodiments of the invention, the boot up time is reduced by predicting and prefetching data after the second boot up sequence because it is probable that the data fetched after the second boot up sequence will be the same or almost the same as data fetched in the prior boot up sequence. Of course, this is a probabilistic approach, and the data read during any particular boot up sequence may have changed since a prior boot up sequence. A boot up read sequence may change from boot up to boot up for various reasons, including but not limited to, the addition or modification of certain software, or processes, occurrences caused by the last user session, or by the saving of certain data by the computer, which may be retained for a subsequent boot up.

As an overview, to optimize the boot up sequence, in one embodiment with respect to FIG. 3, firmware in the memory system 102 monitors and records host read sequences during subsequent boot up operations, where a subsequent boot up means a boot up after the first boot up. A prediction algorithm in the firmware of the memory system 102 is configured to predict addresses and the sector counts of the next (subsequent) boot up sequence based on the addresses and the sector count of a previously recorded or stored boot up sequence.

The predicted addresses and sector counts are pre-fetched during a previous command's last data transfer, and/or during host idle time. The data obtained based on the predicted sequence, when correctly predicted, replaces an older version of the saved boot up sequence data in a data prediction table 350, and is thus used to predict the next boot up sequence. The data prediction table 350 may be a particular portion in the memory 116 known to the firmware of the memory system 102, or may reside in any suitable memory location of the memory 116, or may reside in the SSD 320, or the RAM 212, and the like.

Before the prediction algorithm can be invoked, a valid boot up sequence must first be detected. A boot up sequence may be detected when a power-on reset is performed on the memory system 102, and once detected, the prediction algorithm starts and continues until a predetermined number of reads have occurred for the second and subsequent boot up sequences. The number of reads during which the prediction algorithm continues depends on the number of reads that were stored during previous boot up sequences. This may be determined based on the amount of storage allocated for the data prediction table 350.

Such reads may be saved or recorded in the flash memory or other memory in the memory system 102. Note that detecting a boot up applies only to hard resets, not soft resets. In that regard, a soft reset is considered to be part of the boot up process, thus occurrence of a soft reset does not activate or restart the prediction algorithm. A soft reset can occur at any time and does not result in a relatively known or stable condition, thus does not serve as a reliable basis for prediction.

In addition to detection of a boot up sequence caused by a power-on reset, detection of a wake-up from hibernation may also be used, and is considered to be a true boot up sequence. However, recovery from a standby mode is not considered to be a true boot up sequence. Boot up caused by a power-on reset and reset due to wake up from hibernation may have different read sequences and may be differentiated, for example, by inspecting the "hiberfile.sys" file in a Windows operating systems, which may be located in the main directory (C://).

In an alternate embodiment, if sufficient memory exists in the memory system 102, two separate data prediction tables may be exist, one to predict the read sequence due to a power-on reset induced boot up, and another to predict the read sequence due to a wake-up from hibernation induced boot up. Such separate data prediction tables may be helpful to accommodate the subtle differences seen in the two types of boot up sequences.

With respect to boot up time, it has been observed that there is a considerable difference in host read commands between a first time boot and second or subsequent boot up. However, from the second boot up and thereafter, there may be a substantial similarity in the boot up sequence with respect to the data read command sequence issued by the host. In that regard, for example, the boot up timing sequence of a PandaBoard mobile platform was analyzed. A PandaBoard is a commercially available brand of single board, low-cost, low power, development platform computer based on the Texas Instruments OMAP4430 system on a chip (SoC) architecture.

The boot up timing sequence was analyzed for the PandaBoard running the Android operating system. In the PandaBoard boot up sequence, the host sends a reset to the memory 116 four times, with a few read operations in between. Host delay also exists between the resets, and hence these are not time-critical read operations. After the fourth reset sent by the host 100, there are continuous reads of about 60 MB, which correspond to burst-mode loading the kernel and portions of the operating system from the SSD 320, an eMMC device (an embedded memory and controller combination), or the hard disk drive 330, to the RAM. Thus, increasing the speed of fetching of data in the above-mentioned burst mode would advantageously reduce the boot up time.

Figure 4:
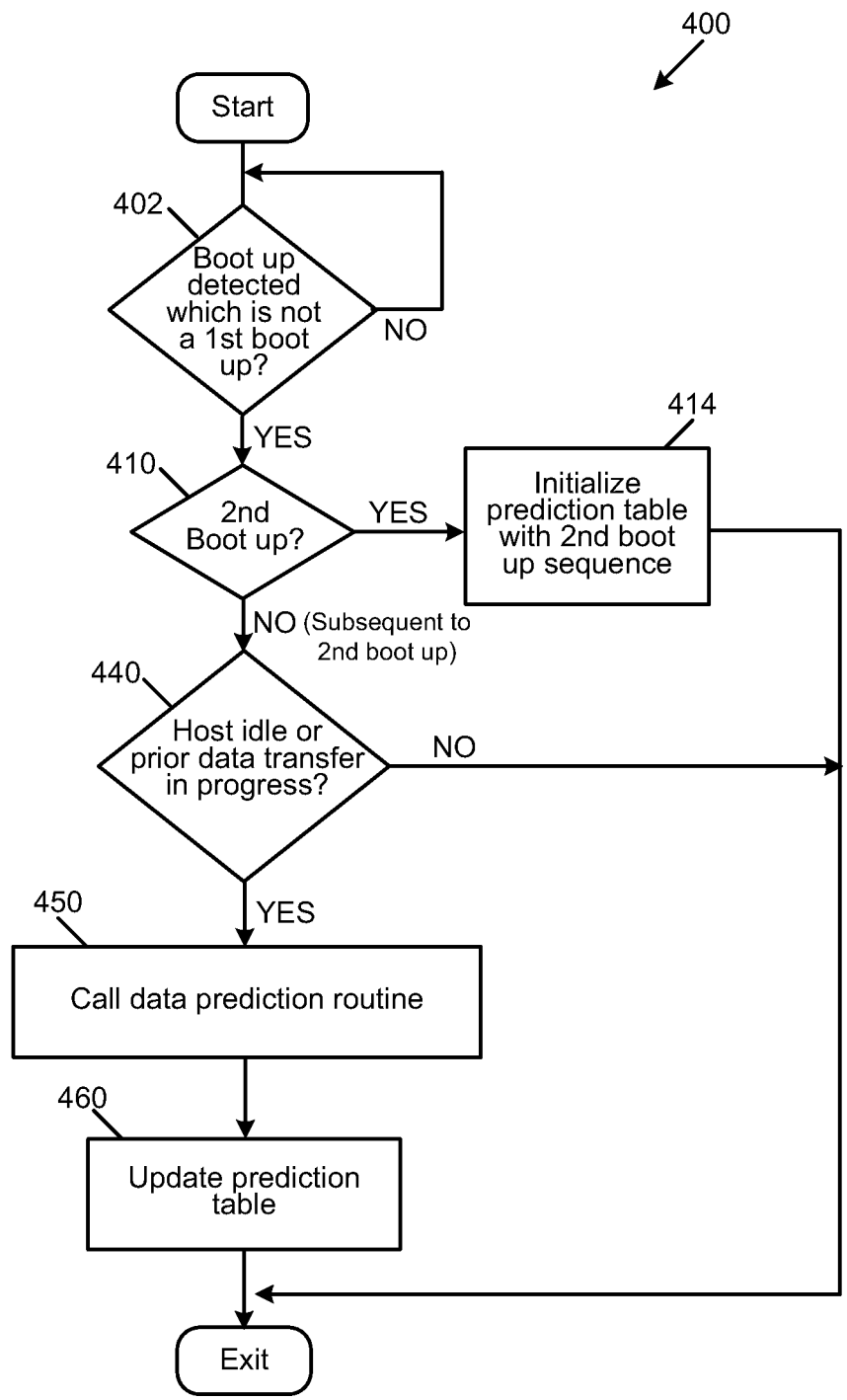
FIG. 4 is a flowchart of a boot up control routine according to one embodiment.

Turning now to FIG. 4, a flowchart of a boot up control routine is shown 400. The routine 400 begins and loops 402 until a reset is detected, meaning a hard reset or a wake-up from hibernation. If a reset is detected 402, the routine determines if this boot up sequence is a second boot up sequence 410. If the boot up sequence is the second boot up, the read commands or sequence of read commands are recorded 414 in the data prediction table to initialize the data prediction table, and the routine exits. Note that a first boot up sequence is disregarded.

The number of reads for which the prediction algorithm continues depends on the number of reads that were stored during previous boot ups. This may be determined based on the amount of storage allocated for the data prediction table, and depends predominantly on the particular host system for which the memory is designed and the number of reads that the host issues in burst mode during boot up.

Returning back to FIG. 4, if the boot up sequence is not the second boot up sequence 410, meaning it is subsequent to the second boot up sequence and is also not a first valid boot up sequence, the routine determines 440 whether the host is in idle mode or if the front end 302 is presently transferring data to the host, which corresponds to the prior read command. If neither condition is satisfied, the routine exits. However, if the host is idle or if the prior data transfer is ongoing, the prediction algorithm is invoked 450, which is described below in greater detail with respect to FIG. 8. After the data prediction routine has returned, the data prediction table is updated with the new sequence of read commends 460.

Figure 5:
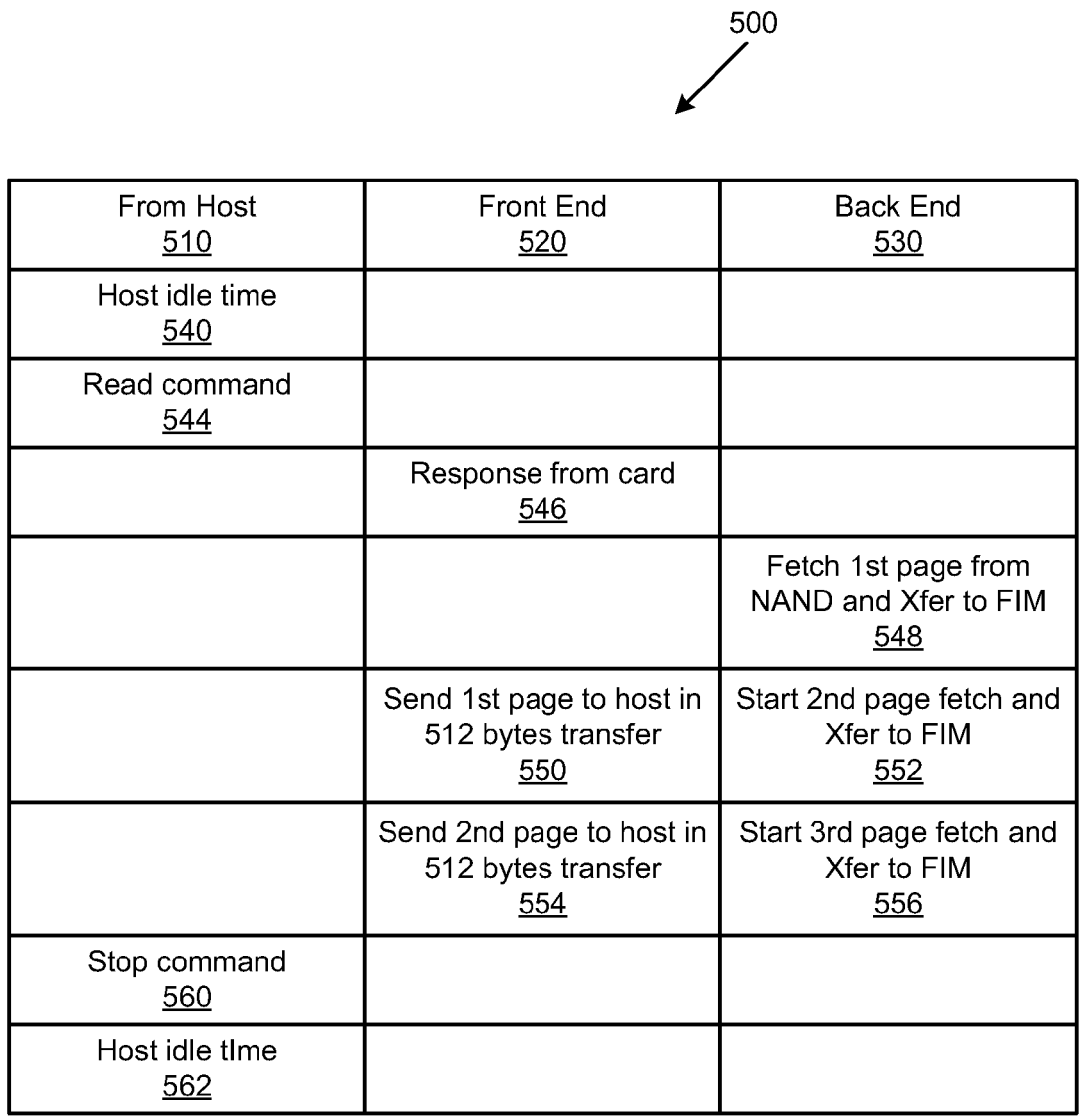
FIG. 5 is a table showing fetch operation of a known open-ended read sequence.

Before discussing the prediction algorithm 450 of some of the embodiments in detail, it may be illustrative to first discuss the conventional boot up sequence and fetching of data. Turning now to FIG. 5, a diagram of a known open-end read command sequence is shown. By way of background, note that two types of read commands exist, namely a close-ended read command and an open-ended read command. The host determines which type of read command is to be sent.

A close-ended read command is sent by the host with an address and the number of sectors to be read in response to the command. An open-ended read command is sent only with an address. With an open-ended read command, once the host receives all its expected data it then sends a stop command between data transmission from the memory system 102 to interrupt the data transmission from the memory system 102 so that the memory system 102 can prepare for receiving the next command from the host.

In FIG. 5, the first column 510 indicates a command transmitted from the host 100 to the memory system 102. The second column 520 indicates a transaction from the memory system 102 to the host 100, while the third column 530 describes the internal operation that the memory system 102 performs to prepare for the transaction.

After the host 100 has been idle 540 after the previous command, the host sends a read command 544. The memory system 102 responds that the command is a legal command and that the arguments are valid 546. Next, the memory system 102 starts to fetch data 548 from the memory 116. After the data has been fetched from the memory 116, the memory system 102 transmits the fetched data to the host 100. In operation, the memory system 102 fetches data from the memory 116 and stores it the RAM of the card, and is later transferred to the host.

Note that transmission to the host 100 takes place in terms of sectors or 512 byte data chunks. Before all of the fetched data temporarily stored in the RAM is transmitted from the memory system 102 to the host 100, the next physical page is fetched 552 from the memory 116 so that once all data of the previous pages are transmitted to the host 100, the memory system 102 immediately has sectors of the next page available in the RAM. This process continues (see 554 and 556) until the host 100 sends the stop command 560. The host 100 may then enter an idle state 562.

However, there are two significant disadvantages in this conventional method. First, memory system 102 wastes time before the first page is fetched from the memory 116. If the memory system 102 were able to predict the incoming read command, it could have fetched the data even before the read command was issued by the host 100. Such predictive actions described in certain embodiments of the invention, in part, capitalize on this wasted time before the host sends the read command.

Second, when a stop transmission command is received between data transfer, the fetched data of the next page from the memory 116 is stored in the RAM of the memory system 102 which the host never used. If the block count that the host needs from the memory device could be predicted, the memory need not waste time fetching the next page unnecessarily and can start fetching first page for the next predicted read command.

With respect to the known read sequence described above, if the back end read time plus the transfer speed is greater than the front end transfer speed, the only factor that reduces the read speed of the full front end bandwidth is the first page fetch and transfer from the memory 116. However, if the back end read time plus the transfer speed is less than the front end transfer speed, it is possible that there are time delays in between the page reads, which will affect read performance. In such a situation, embodiments of the data prediction algorithm is even more advantageous in the sense that the memory device could have fetched more than one page during the previous host idle time if it were sufficiently large, and the time saved will be more significant.

Figure 6:
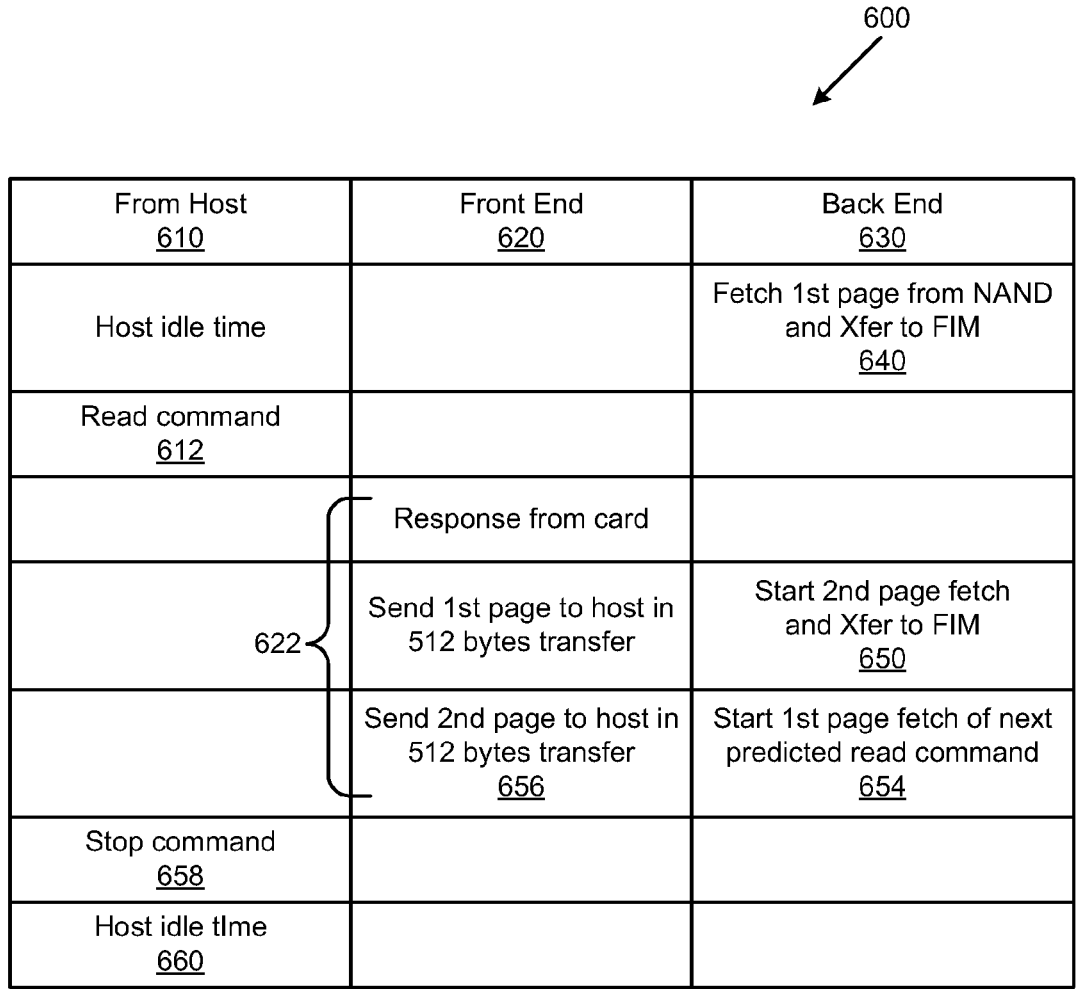
FIG. 6 is a chart showing fetch operation according to one embodiment of a data prediction algorithm.
Figure 7:
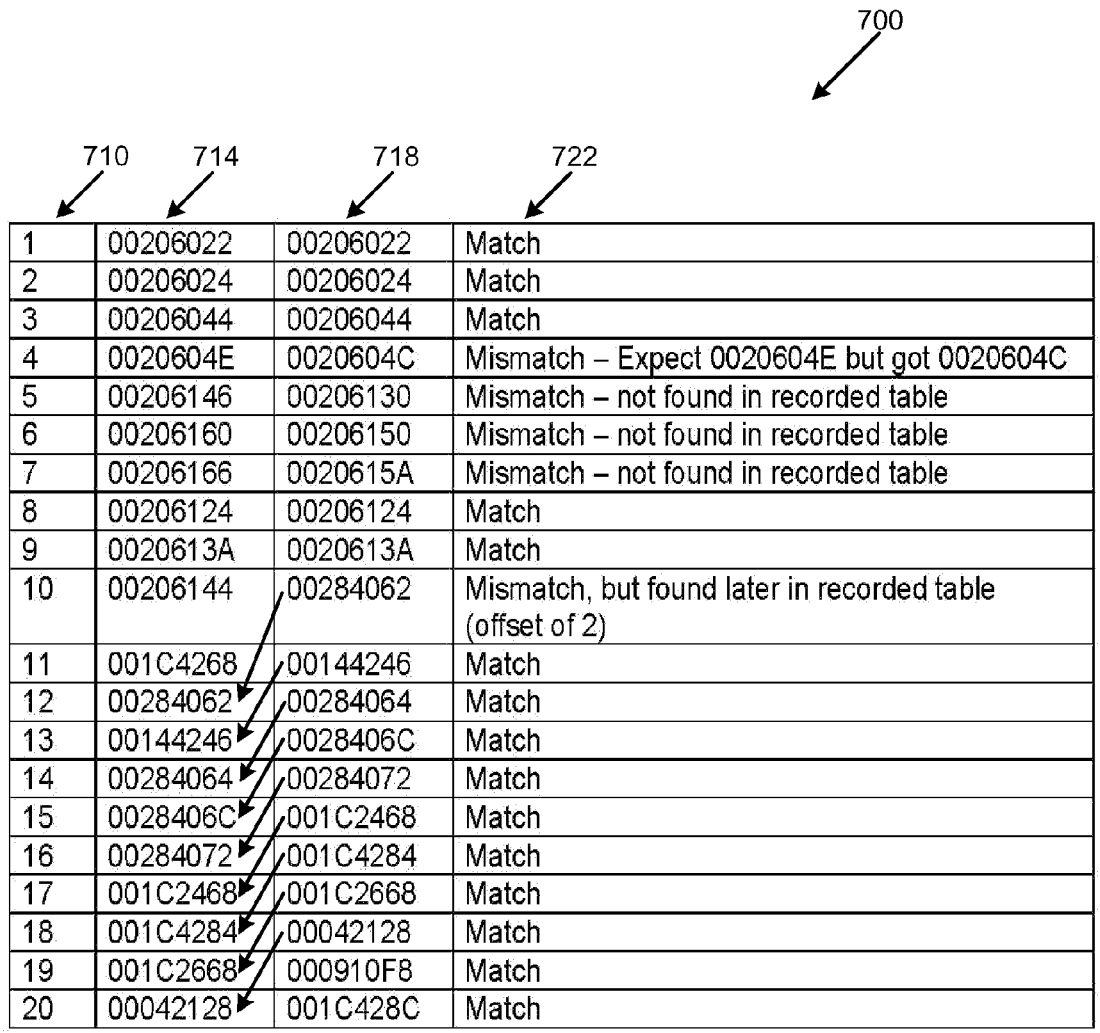
FIG. 7 is a table showing matching and mismatching of fetched data in a data prediction table.
Figure 8:
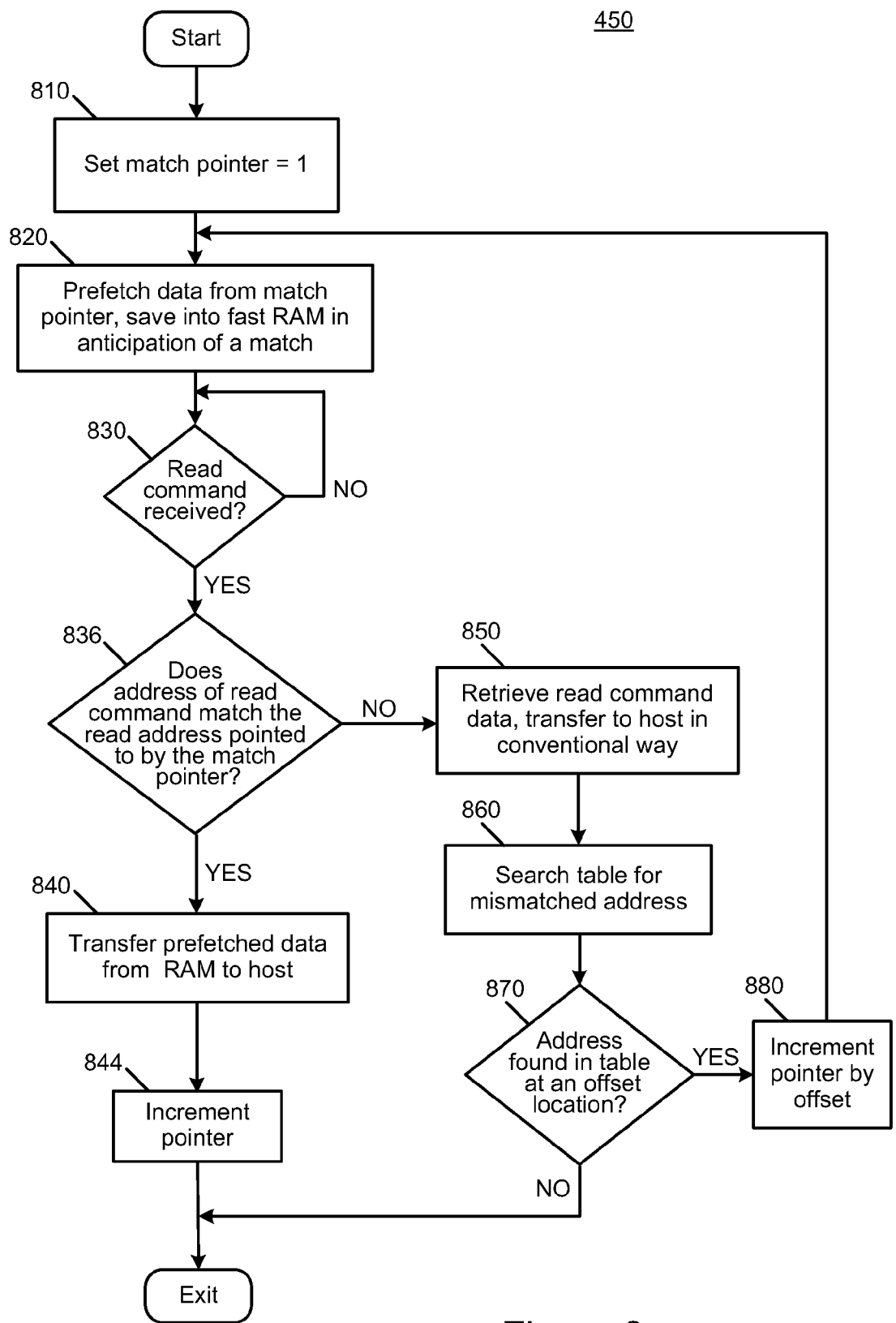
FIG. 8 is a flowchart of a data prediction algorithm according to one embodiment.

Turning now to FIGS. 6-8, FIG. 6 is a table showing fetch operations in accordance with the prediction algorithm 450 of embodiments of the invention. FIG. 7 is a table showing address prediction that occurs during execution of the prediction algorithm, and FIG. 8 is a flow chart of the prediction algorithm 450, which may be executed by the firmware of the memory system 102.

In FIG. 6, as in FIG. 5, the first column 610 indicates a read command transmitted 612 from the host 100 to the memory system 102. The second column 620 indicates the transactions 622 from the memory system 102 to the host 100, while the third column 630 describes the internal operation that the memory system 102 performs to prepare for the transaction.

The fetch operations shown in FIG. 6 occurs after the boot up sequence has been detected and the address and sector counts have been saved in the data prediction table 350 of the memory system 102. As shown in FIG. 6, the memory system 102 card saves time by prefetching data from the memory 116, which is stored in RAM at two specific times, namely 1) during host idle time before the read 740, and 2) during the previous read's last page's transfer 650 to the host. While it is preferable that the prefetch data is stored in RAM, it may be stored in other memories, or in the memory 116 of the memory system 102.

Because during the boot up operation the usual boot up sequence was recorded in the data prediction table 350, the prediction algorithm 450 is effectively able to predict the addresses and the sector counts of the subsequent continuous read operation, which is premised on the assumption that there is a similarity in the read sequence (fetched addresses) in the boot up sequences from the second boot up sequence and subsequent thereto. Thus, the memory system 102 is able to pre-fetch data from the memory 116 into the RAM even before the host 100 issues the read command.

Therefore, in accordance with FIG. 6, an amount of time for fetching the first page of data, is saved for each and every read command. Such time savings incrementally adds and results in a significant reduction in boot up time because the host may issue many read commands during a boot up sequence, usually on the order of many thousands of such commands. For example, the host may issue about 1500 read commands in a typical Android or in similar mobile operating systems. Moreover, the host may issue about 11,000-12,000 read commands in a Windows based or similar PC operating system. Thus, if the fetch time of the first page from the memory 116 is reduced, the boot up time can be correspondingly reduced because the memory system 102 can respond more quickly to each and every read command.

With respect to the predictive data fetching of certain embodiments of the invention, if the host idle time plus the time to transfer the last page of the previous read equals the first page fetch time and the transfer time from NAND flash memory, then the time to fetch and transfer the first page is saved for each and every read command issued during the boot up sequence. Alternatively, if the host idle time plus the time to transfer the last page of the previous read command is greater than the first page fetch time plus the transfer time, then the memory system 102 can start fetching the next page during this time.

FIG. 7 is a table that illustrates the predictive algorithm 450 of certain embodiments of the invention, with examples of matching and mismatching of fetched addresses. The first column 710 corresponding to the data prediction table 350 is a row number added for purposes of discussion only, and does not form part of the actual data prediction table 350. The second column 714 corresponding to the data prediction table 350 shows the address recorded in the data prediction table 350 corresponding to a previous boot up sequence, assuming such a sequence is a sequence after the second boot up sequence.

Note that a subsequent boot up sequence is saved in the data prediction table 350 and replaces a previous boot up sequence. In some embodiments, the data prediction table may always be updated per the most recent boot up sequence because the subsequent boot ups are expected to change in an incremental fashion.

In FIG. 7, each address in the enumerated row corresponds to the start address of the page of memory to be read. Sector counts corresponding to the page address are also saved in the data prediction table, but are not shown in FIG. 7 for purposes of clarity.

The third and fourth columns in FIG. 7 are for purposes of explanation only and do not form part of the data prediction table. The third column 718 shows the addresses corresponding to incoming read commands issued by the host 100, and such incoming addresses are compared against the previously saved boot up sequence of the second column. The fourth column 722 corresponding to the data prediction table 350 indicates whether a match or a mismatch has occurred, along with comments, and like the first column, is shown for purposes of discussion only and does not form part of the actual data prediction table. Note that a match indicates a successful address prediction while a mismatch indicates an unsuccessful prediction.

The below discussion with respect to FIG. 7 will refer to the row numbers for purposes of clarity. As shown in row 1, the address of 00206022 was previously saved in the data prediction table 350. An incoming address of 00206022 requested by the host indicates that a match was found in the data prediction table. Rows 2-3 also indicate a successful match. For each match, the memory system 102 provides the requested data (previously saved in RAM) to the host corresponding to the matched data, thus reducing the required boot up time by the reduction in fetch time shown in FIG. 6.

Row 4 shows that the expected data, that is, the data saved in the data prediction table 350, is 0020604E, but the incoming read corresponds to an address of 0020604C, which is a mismatch. Due to mismatch, the prediction algorithm 450 searches the data prediction table in an attempt to find the mismatched incoming or requested read address of 0020604C. The entire data prediction table may be searched, or in one embodiment, only a predetermined portion may be searched. In the example of FIG. 7, the prediction algorithm searches 20 entries to try to find a match. As shown in the example of FIG. 7, the prediction algorithm 450 does not find the requested address in the data prediction table, even after searching the entire table, and thus the memory system 102 provides the requested data in the conventional manner.

Rows 5-7 show similar data mismatches with no hits in the data prediction table 350. Subsequently, rows 8-9 show that a match was found, thus the additional time savings increases. Row 10 shows that the expected data, that is, the data saved in the data prediction table, is 00206144, but the incoming read corresponds to an address of 00284062, which is a mismatch. Due to mismatch, the prediction algorithm 450 searches the data prediction table in an attempt to find the mismatched incoming read address of 00284062.

In this case, the prediction algorithm 450 does find a match for the read address of 00284062, and finds this matching address in the data prediction table 350, but at an entry shown two rows down in the table, that is, as indicated in row 12. This offset match is shown in FIG. 7 by the arrow pointing from the read address of 00284062 to the found address two rows below. Once there is a mismatch with the predicted address and that address has already been fetched in the conventional manner, there is no advantage for that address to obtain a match. Rather, the subsequent addresses are benefitted.

Similarly, rows 10-18 show similar offset matches all using the offset of two into the data prediction table. This indicates that from row 10 onward, the boot up sequence of requested read data from the host is the same as the boot up sequence of requested read data previously saved in the data prediction table 350, thus the subsequent the boot up sequence, at least from row 10 onward, appears to be the same as the previous boot up sequence, although offset by two. Thus, as shown in FIG. 7, all subsequent boot up read commands are predicted, and incremental time is saved for each.

Referring to the flowchart of FIG. 8, in operation, after power-on reset (or awake from hibernation) has occurred and the boot up control routine of FIG. 4 determines that either host is in idle mode or if the front end is presently transferring data to the host corresponding to the prior read command, the prediction algorithm 450 is invoked. Note that the data prediction table 350 may include, among other data, the addresses and the sector count during each read of the boot up sequence.

As an overview of the prediction algorithm 450 using the data prediction table 350, the memory system 102 can predict many of the next read commands in the boot up sequence because the prediction algorithm 450 expects the same address to be read from the memory 116 (a match) with the same sector count as was previously recorded in the data prediction table 350.

When invoked, the data prediction algorithm of FIG. 8 expects or predicts the reads corresponding to the same addresses with the same block count (and in the same order) as was recorded in the data prediction table during the previous boot up sequence stored in the data prediction table.

If at some point, the expected read was not found, meaning a mismatch occurred, the data prediction algorithm determines if the unexpected or mismatched read request is otherwise present somewhere else in the data prediction table, perhaps out of sequence. If a match is then established, even though out of sequence, the next reads are expected to be in sequence with the subsequent reads after the established match. Thus, there is effectively a shift or offset into the data prediction table 350 where the predicted reads are found.

The prediction algorithm 450 is able to prefetch data in anticipation of having successfully predicted a read request from the host, and can perform such a data prefetch even before the host actually issues the read command. The data that is prefetched in this way may be saved in RAM of the memory system 102. Accordingly, when a successful prediction occurs, the data saved in RAM is transferred to the host, which results in time savings for that read command because the memory system did not need to wait until the read command was received from the host, to fetch the requested data.

As described above, firmware in the memory system 102 prefetches data from the memory 116 and stores it in RAM, in anticipation of a matching read. This occurs during either host idle time or during the time that data for a prior read command is being transferred. Thus, for each incoming read command issued by the host 100 for which a match is found, the prefetched data saved in RAM is transmitted to the host.

Continuing with FIG. 8, once the prediction algorithm 450 is invoked when a second or subsequent valid boot up sequence is detected, the routine expects reads in the same sequence as may be found in the data prediction table and a match pointer value is set to value of one 810. The prediction algorithm 450 then prefetches the data 820 corresponding to the expected read from the memory 116, which may be the SSD 320, HDD 333, or another flash memory device, and saves into the RAM. Note that such prefetching is performed only during host idle time or during a prior data transfer because the prediction algorithm is called in accordance with the logical requirements 440 shown in FIG. 4. The prefetched data is saved in RAM in anticipation of a future match.

Next, the prediction algorithm 450 waits until a current read command is received 830 and loops until the command is received. This may also be an interrupt driven response or occurrence. Once the read command from the host is received, it is compared 836 to the corresponding read command in the data prediction table pointed to by the match pointer. Note that a comparison is made as to the address (page in memory). The read command in the data prediction table specified by the match pointer corresponds to a predicted read command of the recorded boot up sequence.

If a match is found, the memory system 102 transmits to the host, the data in the RAM that was prefetched in anticipation of such a match 840, which results in an incremental time savings. Thus, because this data was prefetched during a time that is normally "unproductive," the time for completing the read command is reduced, which when incrementally added for the many thousands of read commands issued during a boot up sequence, results in a significant reduction in boot up time. Next, the match pointer is incremented 844.

If there is a mismatch between the read command that was previously recorded in the data prediction table and what is actually received 836, that is, the read command actually transmitted by the host, the predictive algorithm retrieves the requested data from the memory 116 in the conventional manner and transmits the requested data to the host 850.

Next, the data prediction table 350 is searched for any location where the mismatched received address is present 860. Note that incoming addresses received after a match are expected to be found at a subsequent addresses in the data prediction table 350 based on an offset into the data prediction table 350. The prediction algorithm 450 is based on expecting same relationship between addresses at the file system level during boot up at different points of time.

If a match is still not found in the data prediction table, the prediction algorithm continues to search the data prediction table in an attempt to find the requested address somewhere in the data prediction table, until it reaches 870 the end of the data prediction table. If no match is found after searching the entire table (or a predetermined portion of the table), the routine exits. If a match is found somewhere in the data prediction table, the match pointer is incremented by the offset and the routine exits. Thus, from the next read onwards, the routine starts expecting or predicting read requests to addresses in prediction table based on the offset.

Note that the boot up time will be reduced due to the time reduction realized when data fetching during the host idle time or during transfer of data for a prior read command, as shown in FIG. 6. If the prediction is not successful, meaning a mismatch, then there is no loss in performance because the memory system 102 will recognize that the incoming address is different from what was predicted and would the carry out the read command in the conventional way.

The length of the data prediction table 350 may be predefined or may vary depending on certain parameters. For example, in a preferred embodiment, the data prediction table may contain 1024 rows corresponding to that number of read commands. The data prediction table may be any suitable length, for example, may be between 128 rows and 64K row in length, depending on the amount of available memory.

Note that the various steps set forth in the flowcharts of FIGS. 4 and 8 are for purposes of illustration only, and represent but one specific way that an embodiment of the invention may be carried out. Various steps may be resident in other subroutines and the order of the steps shown may also vary without departing from the scope of the invention.

Figure 9:
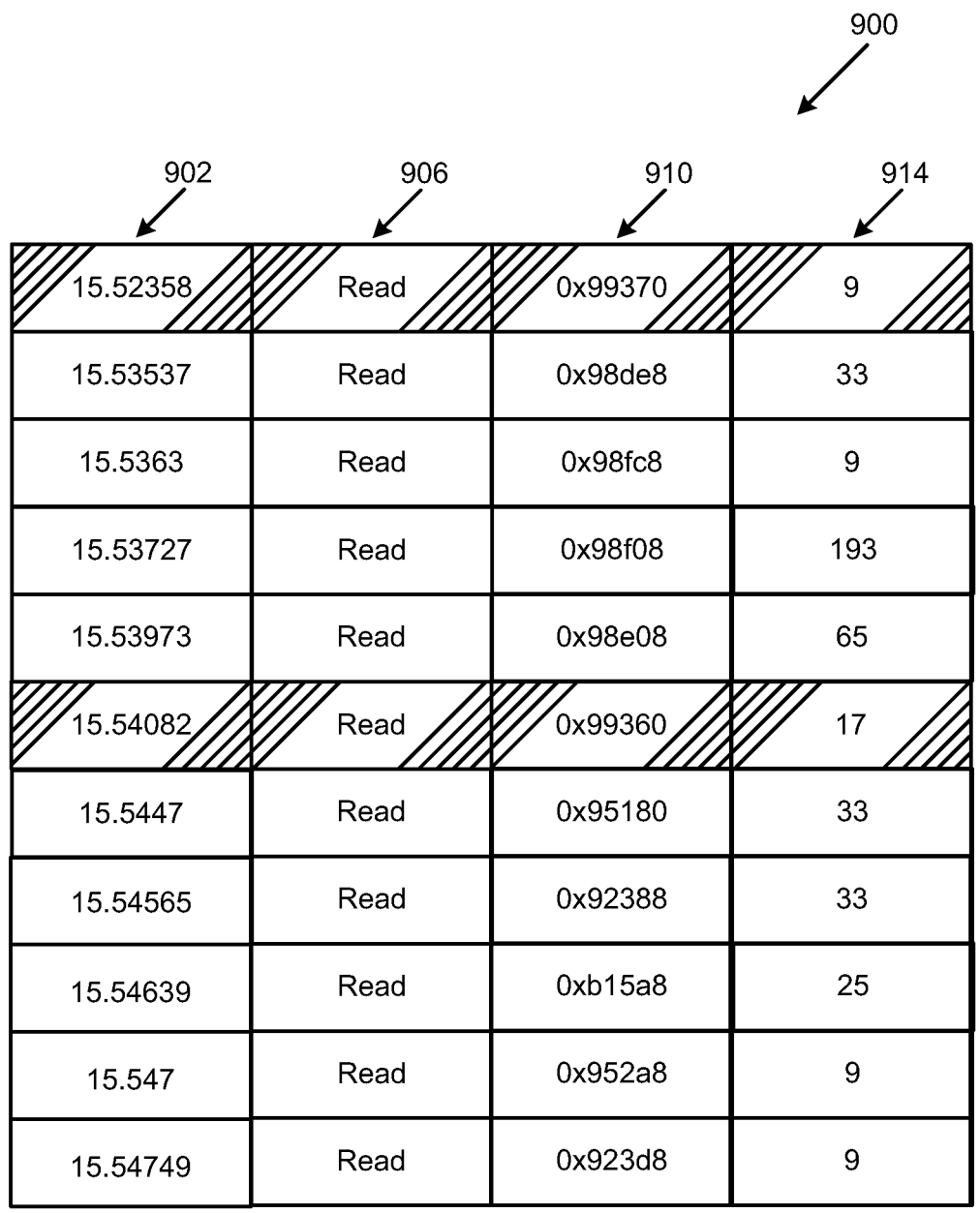
FIG. 9 is a diagram showing further optimization of the boot up sequence timing.

Referring now to FIG. 9, embodiments of the present invention may include further optimization 900 to reduce the boot up time. The first column 902 represents time stamp, which is shown for purposes of illustration only, and does not form part of the data prediction table, the second column 906 represents the command issued by the host, the third column 910 represents the addresses corresponding to the read request, and the fourth column 914 represents the number of sectors requested corresponding to the read request.

Because along with the prediction of the read addresses, the read sizes (sectors) are also predicted, if read size is predicted to be less than a memory page (for example, NAND page size in a flash memory or the like), it may be unnecessary transfer of all data pages from memory 116. Rather, only the predicted amount of data stored in memory 116 need be transferred. Further, if the same physical page read is predicted after a few read operations, the page of memory can be retained in the RAM instead of "wasting" another read.

FIG. 9 shows two such instances in PandaBoard Boot up sequence mentioned above. As shown in FIG. 9, the rows shown in crosshatch indicate distantly placed read requests corresponding to the same physical page of memory, assuming that a physical page size is 0x20. The crosshatched rows indicate that the read addresses of 0x99370 and 0x99360 are read from the same physical page (0x99360-0x99380). However, after the read that first arrives (0x99370), this data is replaced with data from the next upcoming read data in the RAM, and once again after sometime when address 0x99360 is read, one more read from the memory is necessary. If this scenario repeats often, the boot up time may be adversely increased. However, if the second read to the same page is read, this scenario can be avoided by retaining the data from the page in the RAM, thus making the second request to the same page faster.

With respect to tangible empirical results of embodiments of the present invention regarding optimization and an increase in the boot up speed, various measurements were obtained from the PandaBoard platform. For example, the boot up sequence in a typical PandaBoard reads about 64 MB of data from a range of 0-14.6 GB of addresses on a 16 GB device, which corresponds to about 1500 separate commands. Of the total of 64 MB read, 62.8 MB correspond to random reads, which further correspond to about 1000 particular read commands. By applying the above described embodiments, prediction of the addresses and data count were successful in about 1,100 of 1,500 read commands.

By applying various embodiments described, experimental results have shown that it is possible to predict and save a physical page read time for about two thirds of the read commands issued by the host. If more applications are installed on a mobile platform, the boot up sequence may include more reads from the various applications installed. This may increase the number of reads during boot up, thus providing an ideal environment for application of the embodiments described herein. As mentioned above, embodiments of the present invention are applicable to HDDs, and also to SSDs. For example, in accordance with embodiment described above, in an SSD running on a Windows 64 bit operating system, about 6,000 reads out of 14000 total reads were successfully predicted.

Regarding the reduction in boot up time, using an eMMC device, which is an embedded memory and controller combination, during the boot up sequence, the large majority of the reads required about 200 µs to start the first data sector, meaning each read for a single page required about 200 µs. By implementing embodiments of the present invention, for an Android operating system requiring 1000 reads, which corresponds to about a 5 seconds boot up time, the time savings would be about 1000*200 us=200 ms.

For an SSD device running Windows 7 (64 bit), which corresponds to about a 10 second boot up time, the boot up time would be reduced by about 1.2 seconds or about a 12% reduction in time (6000*200 us=1.2 seconds). For a slower device, even more time will be saved if the host idle time permits.

Although the invention has been described with respect to various system and method embodiments, it will be understood that the invention is entitled to protection within the full scope of the appended claims.

The invention claimed is:

1. A method for optimizing a boot up sequence of a computer system, comprising:
   in a memory system controller having a non-volatile data store and a data prediction table, the controller in communication with a host device, the method comprising:
      during a host idle time or during a data transfer corresponding to a prior host read command:
         obtaining a predicted read address from the data prediction table based on a previously determined offset value;
         prefetching from the non-volatile data store, data corresponding to the read address obtained from the data prediction table;
         saving the prefetched data in temporary memory;
      receiving a current read command issued by the host:
         if the read address corresponding to the current read command matches the predicted read address, providing to the host the prefetched data saved in temporary memory, and indicating a match;
         if a match is not indicated, obtaining current data from the non-volatile data store corresponding to the read address of the current read command, and providing the current data to the host; and
         if a match was not indicated, searching the data prediction table for the predicted read address that matches the read address corresponding to the current read command, and if found in the data prediction table, recording the offset value.

2. The method according to claim 1, further comprising initializing the data prediction table by recording a sequence of read commands issued by the host device to the memory system controller, the sequence of read commands corresponding to a second boot up sequence.

3. The method according to claim 1, further comprising recording in the data prediction table a sequence of read commands issued by the host, including memory addresses associated with each read command and a corresponding data count or sector count.

4. The method according to claim 2, further comprising detecting a valid boot up sequence after initialization of the data prediction table.

5. The method according to claim 4, wherein the valid boot up sequence corresponds to a power-on reset or a wake-up from hibernation.

6. The method according to claim 4, wherein the valid boot up sequence excludes soft boot up sequences and recovery from a stand-by mode.

7. The method according to claim 1, wherein the match includes an address match and a corresponding data count or sector count match.

8. The method according to claim 1, wherein the offset value corresponds to a difference in location in the data prediction table between the predicted read address and the read address of the current read command when no match is initially found.

9. The method according to claim 1, wherein the predicted read address obtained from the data prediction table is a read address that is probabilistically predicted to match the current read address issued by the host.

10. The method according to claim 1, wherein the computer system is a mobile telephone, a wireless mobile device, or a personal computer.

11. The method according to claim 1, wherein the memory system controller controls a solid state disk drive or a rotating magnetic disk drive.

12. A method for optimizing a boot up sequence of a computer system comprising: in a memory system controller having a non-volatile data store and a data prediction table, the controller in communication with a host device, the method comprising:
   initializing the data prediction table by recording a sequence of read commands issued by the host device to the memory system controller, the sequence of read commands corresponding to a second boot up sequence;
   detecting a valid boot up sequence after initialization of the data prediction table;
   during a host idle time or during a data transfer corresponding to a prior host read command:
      obtaining a predicted read address from the data prediction table based on a previously determined offset value;
      prefetching from the non-volatile data store, data corresponding to the read address obtained from the data prediction table;
      saving the prefetched data in temporary memory;
   receiving a current read command issued by the host:
      if the read address corresponding to the current read command matches the predicted read address, providing the prefetched data saved in temporary memory to the host, and indicating a match;
      if a match is not indicated, obtaining current data from the non-volatile data store corresponding to the read address of the current read command, and providing the current data to the host; and
   if a match was not indicated, searching the data prediction table for the predicted read address that matches the read address corresponding to the current read command, and if found in the data prediction table, recording an offset value.

13. The method according to claim 12, further comprising recording in the data prediction table a sequence of read commands issued by the host, including memory addresses associated with each read command and a corresponding data count or sector count.

14. The method according to claim 13, wherein the valid boot up sequence excludes soft boot up sequences and recovery from a stand-by mode.

15. The method according to claim 13, wherein the match includes an address match and a corresponding data count or sector count match.

16. The method according to claim 12, wherein the valid boot up sequence corresponds to a power-on reset or a wake-up from hibernation.

17. The method according to claim 1, wherein the offset value corresponds to a difference in location in the data prediction table between the predicted read address and the read address of the current read command when no match is initially found.

18. A memory storage system operative to interface with a host, comprising:
   a memory system controller;
   a non-volatile data store operatively coupled to the memory system controller;
   a data prediction table accessible by the memory system controller;
   the memory system controller configured to:
   initialize the data prediction table by recording a sequence of read commands issued by the host device to the memory system controller, the sequence of read commands corresponding to a second boot up sequence that followed a first boot up sequence;
   detect a valid boot up sequence after initialization of the data prediction table;
   during a host idle time or during a data transfer corresponding to a prior host read command:
      obtain a predicted read address from the data prediction table based on a previously determined offset value;
      prefetch from the non-volatile data store, data corresponding to the read address obtained from the data prediction table;
      save the prefetched data in temporary memory;
   receive a current read command issued by the host;
      if the read address corresponding to the current read command matches the predicted read address, provide the prefetched data saved in temporary memory to the host, and indicate a match;
      if a match is not indicated, obtain current data from the non-volatile data store corresponding to the read address of the current read command, and provide the current data to the host; and
   if a match was not indicated, search the data prediction table for the predicted read address that matches the read address corresponding to the current read command, and if found in the data prediction table, recording an offset value.

\* \* \* \* \*